United States Patent
Tripathi et al.

(10) Patent No.: US 8,635,284 B1
(45) Date of Patent: *Jan. 21, 2014

(54) METHOD AND APPARATUS FOR DEFENDING AGAINST DENIAL OF SERVICE ATTACKS

(75) Inventors: Sunay Tripathi, San Jose, CA (US); Radia J. Perlman, Sammamish, WA (US); Nicolas G. Droux, San Jose, CA (US)

(73) Assignee: Oracle Amerca, Inc., Redwood Shores, CA (US)

( * ) Notice: Subject to any disclaimer, the term of this patent is extended or adjusted under 35 U.S.C. 154(b) by 1878 days.

This patent is subject to a terminal disclaimer.

(21) Appl. No.: 11/255,366

(22) Filed: Oct. 21, 2005

(51) Int. Cl.
G06F 15/16 (2006.01)
H04L 29/06 (2006.01)
G06F 11/30 (2006.01)

(52) U.S. Cl.
USPC ............ 709/206; 709/207; 713/153; 713/188

(58) Field of Classification Search
None
See application file for complete search history.

(56) References Cited

U.S. PATENT DOCUMENTS

| | | | |
|---|---|---|---|
| 5,905,876 A * | 5/1999 | Pawlowski et al. ........... 710/112 |
| 6,041,053 A | 3/2000 | Douceur et al. |
| 6,070,219 A | 5/2000 | McAlpine et al. |
| 6,163,539 A | 12/2000 | Alexander et al. |
| 6,477,643 B1 | 11/2002 | Vorbach et al. |
| 6,600,721 B2 | 7/2003 | Edholm |
| 6,714,960 B1 | 3/2004 | Bitar et al. |
| 6,757,731 B1 | 6/2004 | Barnes et al. |
| 6,831,893 B1 | 12/2004 | Ben Nun et al. |
| 6,859,841 B2 | 2/2005 | Narad et al. |
| 6,944,168 B2 | 9/2005 | Paatela et al. |
| 7,046,665 B1 | 5/2006 | Walrand et al. |
| 7,177,311 B1 | 2/2007 | Hussain et al. |
| 7,260,102 B2 | 8/2007 | Mehrvar et al. |
| 7,313,142 B2 | 12/2007 | Matsuo et al. |
| 2002/0120702 A1 * | 8/2002 | Schiavone et al. ............ 709/207 |
| 2002/0120853 A1 * | 8/2002 | Tyree ............................ 713/188 |
| 2003/0037154 A1 | 2/2003 | Poggio et al. |
| 2003/0110400 A1 * | 6/2003 | Cartmell et al. .............. 713/202 |
| 2004/0181571 A1 * | 9/2004 | Atkinson et al. .............. 709/200 |
| 2004/0181581 A1 * | 9/2004 | Kosco ........................... 709/206 |
| 2005/0015455 A1 * | 1/2005 | Liu ............................... 709/207 |
| 2005/0122980 A1 * | 6/2005 | Anand et al. ............... 370/395.4 |
| 2005/0132060 A1 * | 6/2005 | Mo et al. ....................... 709/227 |

(Continued)

OTHER PUBLICATIONS

Dovrolis, C., Thayer, B. and Ramanathan, P.: "Hip: Hybrid Interrupt—Polling for the Network Interface", ACM SIGOPS Operating Systems Review, vol. 35, Iss. 4, Oct. 2001, (11 Pages).

*Primary Examiner* — Brandon Renner
(74) *Attorney, Agent, or Firm* — Osha Liang LLP

(57) ABSTRACT

A method for processing packets that includes receiving a packet from a network, analyzing the packet to obtain packet information used to determine to which temporary data structure to forward the packet, if a first list includes the packet information forwarding the packet to a first temporary data structure, and processing the packet from the first temporary data structure, and if the first list does not include the packet information forwarding the packet to a second temporary data structure, processing the packet, wherein processing the packet comprises: sending a first test to a source of the packet using the packet information, placing the packet information on the first list, if a successful response to the first test is received, and placing the packet information on a second list, if an unsuccessful response to the first test is received.

16 Claims, 9 Drawing Sheets

(56) References Cited

U.S. PATENT DOCUMENTS

| | | |
|---|---|---|
| 2005/0135243 A1 | 6/2005 | Lee et al. |
| 2005/0138620 A1 | 6/2005 | Lewites |
| 2005/0198099 A1* | 9/2005 | Motsinger et al. ............ 709/200 |
| 2005/0228873 A1* | 10/2005 | Tapuska et al. ............... 709/219 |
| 2005/0228984 A1* | 10/2005 | Edery et al. ................... 713/153 |
| 2006/0026246 A1* | 2/2006 | Fukuhara et al. ............. 709/206 |
| 2006/0031680 A1* | 2/2006 | Maiman ........................ 713/182 |
| 2006/0041667 A1 | 2/2006 | Ahn et al. |
| 2006/0047769 A1* | 3/2006 | Davis et al. ................... 709/207 |
| 2006/0070066 A1 | 3/2006 | Grobman |
| 2006/0168033 A1* | 7/2006 | Cai et al. ....................... 709/206 |
| 2006/0174324 A1 | 8/2006 | Zur et al. |
| 2006/0271631 A1* | 11/2006 | Qureshi et al. ................ 709/206 |
| 2007/0250644 A1* | 10/2007 | Lund et al. .................... 709/245 |

* cited by examiner

METHOD AND APPARATUS FOR DEFENDING AGAINST DENIAL OF SERVICE ATTACKS

CROSS-REFERENCE TO RELATED APPLICATIONS

The present application contains subject matter that may be related to the subject matter in the following U.S. applications filed on Apr. 22, 2005, and assigned to the assignee of the present application: "Method and Apparatus for Managing and Accounting for Bandwidth Utilization Within A Computing System" with U.S. application Ser. No. 11/112,367; "Method and Apparatus for Consolidating Available Computing Resources on Different Computing Devices" with U.S. application Ser. No. 11/112,368; "Assigning Higher Priority to Transactions Based on Subscription Level" with U.S. application Ser. No. 11/112,947; "Method and Apparatus for Dynamically Isolating Affected Services Under Denial of Service Attack" with U.S. application Ser. No. 11/112,158; "Method and Apparatus for Improving User Experience for Legitimate Traffic of a Service Impacted by Denial of Service Attack" with U.S. application Ser. No. 11/112,629; "Method and Apparatus for Limiting Denial of Service Attack by Limiting Traffic for Hosts" with U.S. application Ser. No. 11/112,328; "Hardware-Based Network Interface Per-Ring Resource Accounting" with U.S. application Ser. No. 11/112,222; "Dynamic Hardware Classification Engine Updating for a Network Interface" with U.S. application Ser. No. 11/112,934; "Network Interface Card Resource Mapping to Virtual Network Interface Cards" with U.S. application Ser. No. 11/112,063; "Network Interface Decryption and Classification Technique" with U.S. application Ser. No. 11/112,436; "Method and Apparatus for Enforcing Resource Utilization of a Container" with U.S. application Ser. No. 11/112,910; ("Method and Apparatus for Enforcing Packet Destination Specific Priority Using Threads" with U.S. application Ser. No. 11/112,584; "Method and Apparatus for Processing Network Traffic Associated with Specific Protocols" with U.S. application Ser. No. 11/112,228; "Router Based Defense Against Denial of Service Attacks Using Dynamic Feedback from Attacked Host" with U.S. Application Ser. No. 11/256,254 filed on the same day as this application; and "Method and Apparatus for Monitoring Packets at High Data Rates" with U.S. application Ser. No. 11/226,790.

BACKGROUND

Network traffic is transmitted across a network, such as the Internet, from a sending system (e.g., a computer system) to a receiving system (e.g., a computer system) via a network interface card (NIC). The NIC is a piece of hardware found in a typical computer system that includes functionality to send and receive network traffic. Typically, network traffic is transmitted in the form of packets, where each packet includes a header and a payload. The header contains information regarding the source address, destination address, size, transport protocol used to transmit the packet, and various other identification information associated with the packet. The payload contains the actual data to be transmitted from the network to the receiving system.

Each of the packets sent between the sending system and receiving system is typically associated with a connection. The connection ensures that packets from a given process on the sending system reach the appropriate process on the receiving system. Packets received by the receiving system (via a NIC associated with the receiving system) are analyzed by a classifier to determine the connection associated with the packet.

With the rising popularity of offering critical services (e.g., web services, applications, identity services, mail services, etc.) on the Internet, attacks on the receiving system that offer such critical services have become relatively common. A common attack is a denial of service (DoS) attack where a sending system bombards a receiving system (i.e., host) with a large number of packets causing excessive amounts of endpoint, and possibly transit, network bandwidth (or resources) to be consumed. Such attacks are commonly referred to as packet flooding attacks. Recently, the use of source IP address spoofing during DoS attacks and the advent of distributed attack methods and tools have provided a continuing challenge in the area of DoS attack prevention.

The Internet is entirely composed of limited resources. Such limited resources as network bandwidth, processor resources, and storage capacities are all common targets for DoS attacks designed to consume enough of a host's available resources to cause some level of service disruption. One reaction to DoS attacks is to overprovision a system to handle excess loads that may be generated by the attack. However, a limit exists to the amount of limited resources that can be allocated to a system, both in terms of availability and cost. Accordingly, most of the service providers with any level of critical services on the Internet deploy various kinds of resource consumption monitors to assist in identifying when packet destinations (i.e., containers or services) are consuming excessive resources, such as network bandwidth and CPU resources, and/or subject to a DoS attack.

Attacks initiated on a single container or service, which is located on a single computer system with multiple containers and services, has the effect of disrupting all containers or services on the computer system. Consider an example where an Internet Service Provider (ISP) (e.g., Earthlink, AOL, Yahoo, etc.) hosts multiple websites on the same physical computer system by establishing several containers, which are virtual application environments. If only one of the websites hosted on the same computer system is under a DoS attack, then the entire computer system grinds to a halt and all other containers on the same computer system suffer. Customers running multiple services on the same machine are faced with the same problem. For example, if a customer runs a http and a https based service on the same computer system and a DoS attack is initiated against just one service, all services on that computer system grind to a halt.

SUMMARY

In general, in one aspect, the invention relates to a method for processing packets, comprising receiving a packet from a network, analyzing the packet to obtain packet information used to determine to which temporary data structure to forward the packet, if a first list comprises the packet information forwarding the packet to a first temporary data structure, and processing the packet from the first temporary data structure, and if the first list does not comprise the packet information forwarding the packet to a second temporary data structure, processing the packet, wherein processing the packet comprises sending a first test to a source of the packet using the packet information, placing the packet information on the first list, if a successful response to the first test is received, and placing the packet information on a second list, if an unsuccessful response to the first test is received.

In general, in one aspect, the invention relates to a system, comprising a network interface configured to receive a plurality of packets from a network, a classifier operatively connected to the network interface configured to analyze each of the plurality of packets to determine to which of a plurality of temporary data structures each of the plurality of packet is forwarded, a first of the plurality of temporary data structures configured to receive packets from the classifier, wherein packet information for each of the plurality of packets forwarded to the first of the plurality of temporary data structure is on a first list, a second of the plurality of temporary data structures configured to receive packets from the classifier, wherein packet information for each of the plurality of packets forwarded to the second of the plurality of temporary data structure is on a second list, a third of the plurality of temporary data structures configured to receive packets from the classifier, wherein packet information for each of the plurality of packets forwarded to the third of the plurality of temporary data structure is not on the first list or the second list, wherein the system is configured to send a first test to a source of each of the plurality of packets stored on the second of the plurality of temporary data structures, and place packet information for each of the plurality of packets whose source supplies a successful response to the first test on the first list.

In general, in one aspect, the invention relates to a computer readable medium, comprising instructions for receiving a packet from a network, analyzing the packet to obtain packet information used to determine to which temporary data structure to forward the packet, if a first list comprises the packet information forwarding the packet to a first temporary data structure, and processing the packet from the first temporary data structure, and if the first list does not comprise the packet information forwarding the packet to a second temporary data structure, processing the packet, wherein processing the packet comprises sending a first test to a source of the packet using the packet information, placing the packet information on the first list, if a successful response to the first test is received, and placing the packet information on a second list, if an unsuccessful response to the first test is received.

Other aspects of the invention will be apparent from the following description and the appended claims.

DETAILED DESCRIPTION

Figure 1A:
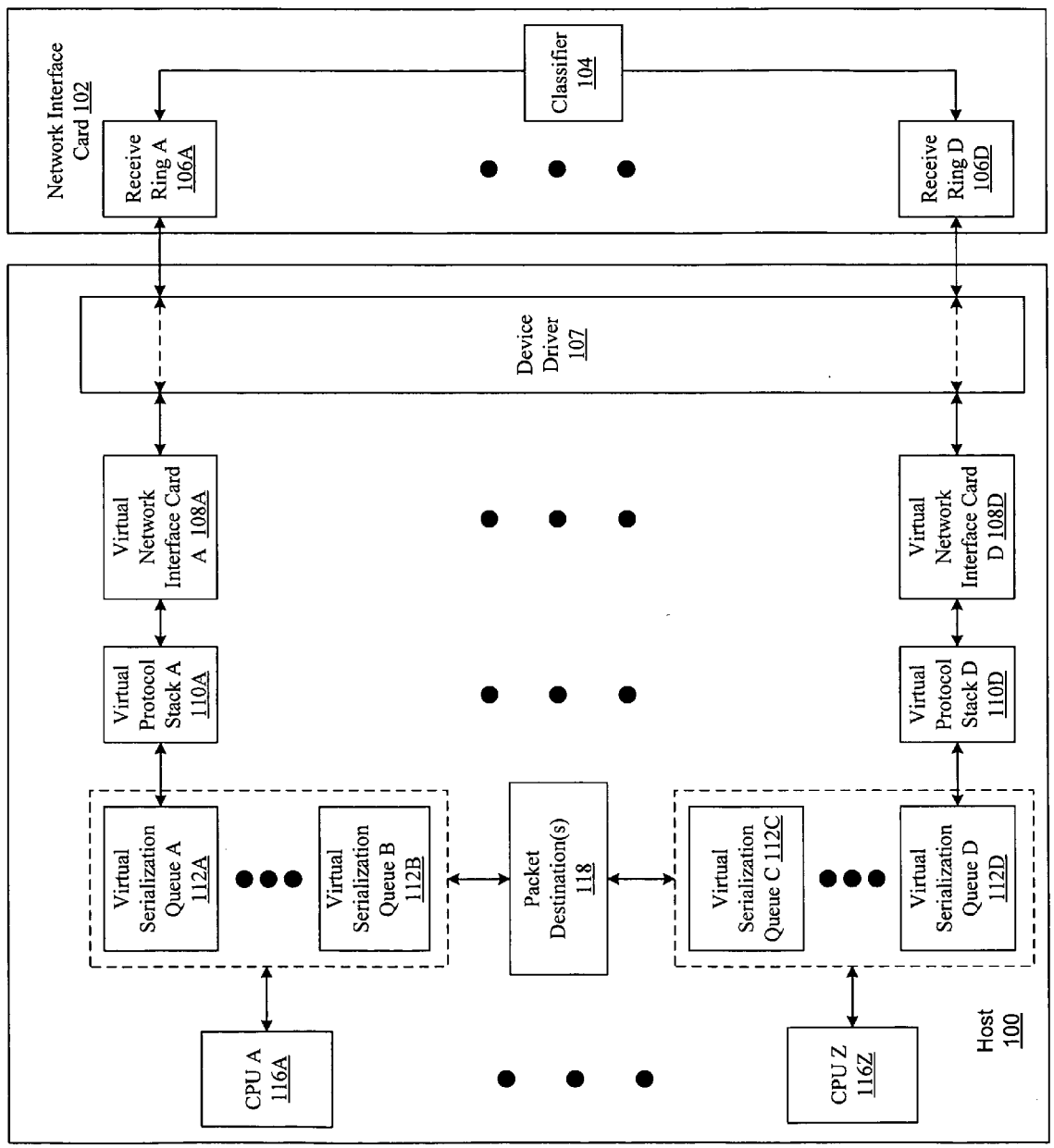
FIGS. 1A and 1B show a system in accordance with one embodiment of the invention.

Exemplary embodiments of the invention will be described with reference to the accompanying drawings. Like items in the drawings are shown with the same reference numbers.

In an embodiment of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, embodiments of the invention relate to a method and apparatus for defending against a denial of service attack. More specifically, embodiments of the invention relate to a method and apparatus for defending against a denial of service (DoS) attack using a classifier, receive rings, a Turing test, and a DoS countermeasure policy.

FIG. 1A shows a system in accordance with one embodiment of the invention. As shown in FIG. 1A, the system includes a host (100) operatively connected to a NIC (102). The NIC (102) provides an interface between the host (100) and a network (not shown) (e.g., a local area network, a wide area network, a wireless network, etc.). More specifically, the NIC (102) includes a network interface (NI) (i.e., the hardware on the NIC used to interface with the network). For example, the NI may correspond to an RJ-45 connector, a wireless antenna, etc. The packets received by the NI are then forwarded to other components on the NIC (102) for processing. In one embodiment of the invention, the NIC (102) includes a classifier (104) and one or more receive rings (106A, 106D). In one embodiment of the invention, the receive rings (106A, 106D) correspond to portions of memory within the NIC (102) used to temporarily store the received packets. Further, in one embodiment of the invention, a ring element of the receive rings (106A, 106D) may point to host memory. In one embodiment of the invention, the classifier (104) is configured to analyze the incoming network traffic, typically in the form of packets, received from the network (not shown).

In one embodiment of the invention, analyzing individual packets includes determining to which of the receive rings (106A, 106D) each packet is forwarded. In one embodiment of the invention, at least one receiver ring (106A, 106D) is configured to store packets in accordance with a DoS countermeasure policy (discussed below).

In one embodiment of the invention, analyzing the packets by the classifier (104) includes analyzing one or more fields in each of the packets to determine to which of the receive rings (106A, 106D) the packets are forwarded. As an alternative, the classifier (104) may use the contents of one or more fields in each packet as an index into a data structure that includes information necessary to determine to which receive ring (106A, 106D) that packet is forwarded. The classifier (104) may be implemented entirely in hardware (i.e., the classifier (104) may be a separate microprocessor embedded on the NIC (102)). Alternatively, the classifier (104) may be implemented in software stored in memory (e.g., firmware, etc.) on the NIC and executed by a microprocessor on the NIC (102).

In one embodiment of the invention, the host (100) may include the following components: a device driver (107), one or more virtual NICs (108A, 108D), one or more virtual protocol stacks (110A, 110D), one or more virtual serialization queues (112A, 112B, 112C, 112D), one or more CPUs (116A, 116Z), and one or more packet destinations (118) (e.g., containers and/or services). In one embodiment of the invention, the device driver (107) provides an interface between the receive rings (106A, 106D) and the host (100). More specifically, the device driver (107) exposes the receive rings (106A, 106D) to the host (100). In one embodiment of the invention, each of the virtual NICs (108A, 108D) is associated with one or more receive rings (106A, 106D). The virtual NICs (108A, 108D) provide an abstraction layer between the NIC (102) and the various packet destinations (118) (e.g., containers and/or services) executing on the host (100). More specifically, each virtual NIC (108A, 108D) operates like a NIC (100). For example, in one embodiment of the invention, each virtual NIC (108A, 108D) is associated with one or more Internet Protocol (IP) addresses, one or more Transmission Control Protocol (TCP) ports, and configured to handle one or more protocol types. Thus, while the host (100) may be operatively connected to a single NIC (102), packet destinations (118) (e.g., containers and/or services) executing on the host (100)) operate as if the host (100) is bound to multiple NICs.

Each of the virtual NICs (108A, 108D) is operatively connected to a corresponding virtual protocol stack (110A, 110D). In one embodiment of the invention, each virtual protocol stack (110A, 110D) includes functionality to process packets in accordance with various protocols used to send and receive packets (e.g., Transmission Communication Protocol (TCP), Internet Protocol (IP), User Datagram Protocol (UDP), etc.). Further, each virtual protocol stack (110A, 110D) may also include functionality, as needed, to perform additional processing on the incoming and outgoing packets. This additional processing may include, but is not limited to, cryptographic processing, firewall routing, etc.

In one embodiment of the invention, each virtual protocol stack (110A, 110D) includes network layer and transport layer functionality. In one embodiment of the invention, network layer functionality corresponds to functionality to manage packet addressing and delivery on a network (e.g., functionality to support IP, Address Resolution Protocol (ARP), Internet Control Message Protocol, etc.). In one embodiment of the invention, transport layer functionality corresponds to functionality to manage the transfer of packets on the network (e.g., functionality to support TCP, UDP, Stream Control Transmission Protocol (SCTP), etc.).

In one embodiment of the invention, each virtual protocol stack (e.g., Virtual Protocol Stack A (110A), Virtual Protocol Stack D (110D)) is associated with a virtual serialization queue (e.g., Virtual Serialization Queue A (112A), Virtual Serialization Queue A (112D), respectively). In one embodiment of the invention, each virtual serialization queue (112A, 112B, 112C, 112D) corresponds to a data structure having at least two queues, an inbound queue and an outbound queue. Each of the queues within the virtual serialization queues (112A, 112B, 112C, 112D) are typically implemented as first-in first-out (FIFO) queues. Further, each virtual serialization queue (112A, 112B, 112C, 112D) is configured to send and receive packets from an associated virtual NIC (108A, 108D) via an associated virtual protocol stack (110A, 110D). In addition, each virtual serialization queue (112A, 112B, 112C, 112D) is configured to send and receive packets from one or more associated packet destinations (118) (e.g., containers and/or services). The structure of the virtual serialization queue (112A, 112B, 112C, 112D) is discussed below in detail and shown in FIG. 3.

As discussed above, the host (100) may include one or more CPUs (116A, 116Z). Further, each virtual serialization queue (112A, 112B, 112C, 112D) is bound to one of the CPUs (116A, 116Z). As shown in FIG. 1A, a pair of virtual serialization queues (e.g., Virtual Serialization Queue A (112A) and Virtual Serialization Queue B (112B)) is bound to one CPU (e.g., CPU A (116A)). Although FIG. 1 shows a pair of virtual serialization queues bound to a single CPU, those skilled in the art will appreciate that any number of virtual serialization queues may be bound to a CPU.

As discussed above, the host (100) includes one or more packet destinations (118) (e.g., containers and/or services). In one embodiment of the invention, the packet destination(s) (118) (e.g., containers and/or services) corresponds to any process or group of processes executing on the host that sends and receives network traffic. Examples of packet destinations (118) include, but are not limited to containers, services (e.g., web server), etc.

Figure 1B:
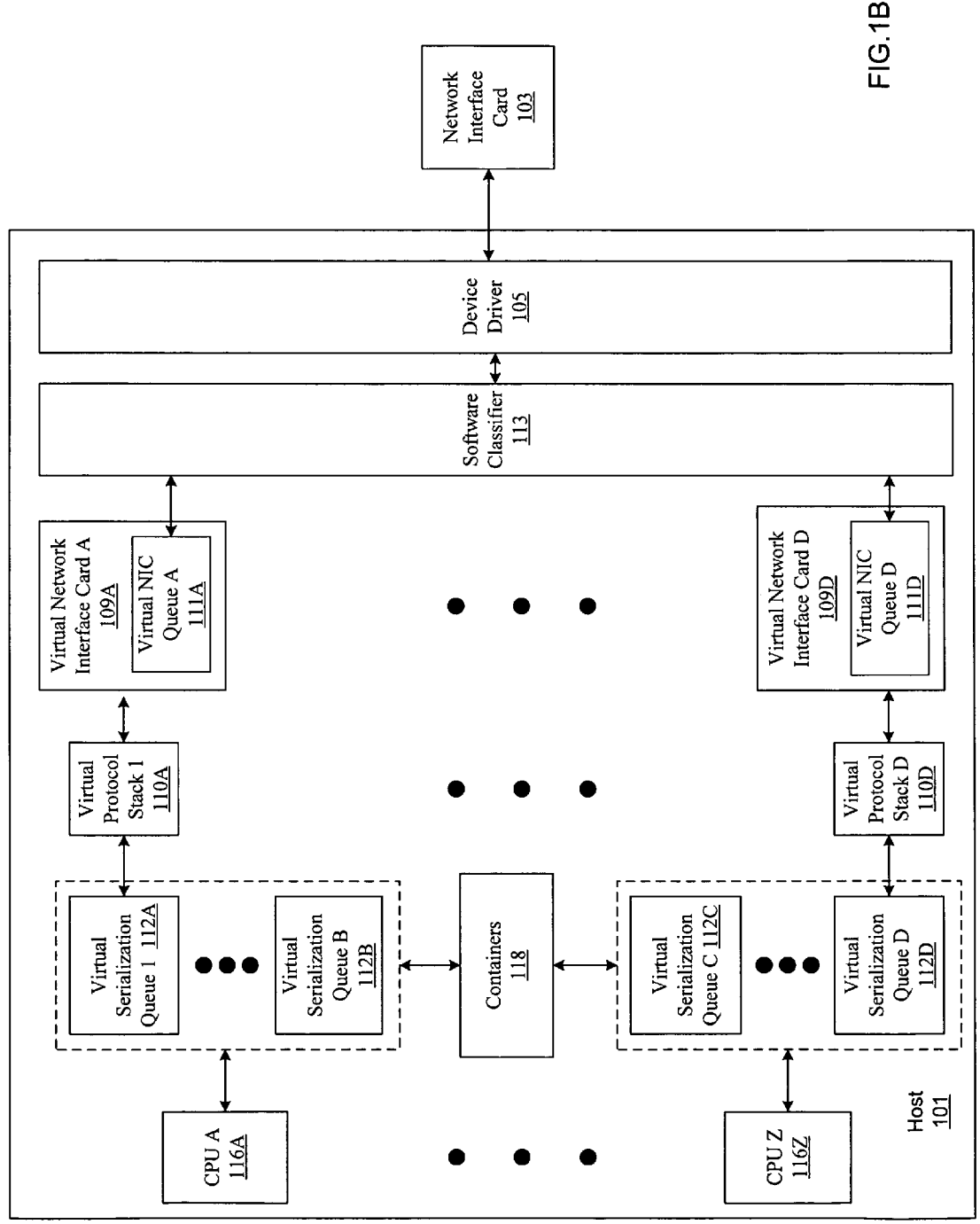

FIG. 1B shows a system in accordance with another embodiment of the invention. As shown in FIG. 1B, the system includes a host (101) operatively connected to a NIC (103). The NIC (103) provides an interface between the host (101) and a network (not shown) (e.g., a local area network, a wide area network, a wireless network, etc.). More specifically, the NIC (102) includes an NI (i.e., the hardware on the NIC used to interface with the network). For example, the NI may correspond to an RJ-45 connector, a wireless antenna, etc. The packets received by the NI are then forwarded to other components on the NIC (103) for processing, etc.

In one embodiment of the invention, the host (101) may include the following components: a device driver (105), a software classifier (113), one or more virtual NICs (109A, 109D), one or more virtual protocol stacks (110A, 110D), one or more virtual serialization queues (112A, 112B, 112C, 112D), one or more CPUs (116A, 116Z), and one packet destination (118) (e.g., containers and/or services). In one embodiment of the invention, the software classifier (113) is configured to analyze the incoming network traffic, typically in the form of packets, received from the network (not shown).

In one embodiment of the invention, the purpose of classifying the packets is to determine to which of the virtual NIC queues (111A, 111D) each of the packets is forwarded. In one embodiment of the present invention, at least one virtual NIC queue (111A, 111D) is configured to store packets in accordance with a the DoS countermeasure policy (discussed below).

Continuing with the discussion of FIG. 1B, in one embodiment of the invention, the virtual NIC queues (111A, 111D) correspond to portions of memory (e.g., buffers) within the host (101) used to temporarily store packets. In one embodiment of the invention, analyzing the packets by the software classifier (113) includes analyzing one or more fields in the packet to determine to which of the virtual NIC queues (111A, 111D) each of the packets is forwarded. As an alternative, the software classifier (113) may use the contents of one or more fields in each packet as an index into a data structure that includes information necessary to determine which virtual NIC queue (111A, 111D) each of the packets is forwarded.

As shown in FIG. 1B, the device driver (105) is operatively connected to the software classifier (113) and provides an interface between the NIC (103) and the host (101). In one embodiment of the invention, each of the virtual NICs (109A, 109D) includes one or more virtual NIC queues (111A, 111D). The virtual NICs (109A, 109D) provide an abstraction layer between the NIC (103) and the various packet destinations (118) (e.g., containers and/or services) executing on the host (101). More specifically, each virtual NIC (109A, 109D) operates like a NIC (101). For example, in one embodiment of the invention, each virtual NIC (109A, 109D) is associated with one or more Internet Protocol (IP) addresses, one or more ports, and configured to handle one or more protocol types. Thus, while the host (101) may be operatively connected to a single NIC (103), the host (101) (or more specifically, packet destinations (118) (e.g., containers and/or services) (at both the kernel level and the user-level) executing on the host (101)) operate as if the host (101) is bound to multiple NICs.

Each of the virtual NICs (109A, 109D) is operatively connected to a corresponding virtual protocol stack (110A, 110D). In one embodiment of the invention, each virtual protocol stack (110A, 110D) includes functionality to process packets in accordance with various protocols used to send and receive packets (e.g., TCP, IP, UDP, etc.). Further, each virtual protocol stack (110A, 110D) may also include functionality, as needed, to perform additional processing on the incoming and outgoing packets. This additional processing may include, but is not limited to, cryptographic processing, firewall routing, etc.

In one embodiment of the invention, each virtual protocol stack (110A, 110D) includes network layer and transport layer functionality. In one embodiment of the invention, network layer functionality corresponds to functionality to manage packet addressing and delivery on a network (e.g., functionality to support ARP, Internet Control Message Protocol, etc.). In one embodiment of the invention, transport layer functionality corresponds to functionality to manage the transfer of packets on the network (e.g., functionality to support TCP, UDP, SCTP, etc.).

In one embodiment of the invention, each virtual protocol stack (e.g., Virtual Protocol Stack A (110A), Virtual Protocol Stack D (110D)) is associated with a virtual serialization queue (e.g., Virtual Serialization Queue A (112A), Virtual Serialization Queue A (112D), respectively). In one embodiment of the invention, each virtual serialization queue (112A, 112B, 112C, 112D) corresponds to a data structure having at least two queues, an inbound queue and an outbound queue. Each of the queues within the virtual serialization queues (112A, 112B, 112C, 112D) are typically implemented as first-in first-out (FIFO) queues. Further, each virtual serialization queue (112A, 112B, 112C, 112D) is configured to send and receive packets from associated virtual NICs (109A, 109D) via an associated virtual protocol stack (110A, 110D). In addition, each virtual serialization queue (112A, 112B, 112C, 112D) is configured to send and receive packets from one or more associated packet destinations (118) (e.g., containers and/or services). The structure of the virtual serialization queue (112A, 112B, 112C, 112D) is discussed below in detail and shown in FIG. 3. As discussed above, the host (101) may include one or more CPUs (116A, 116Z). Further, each virtual serialization queue (112A, 112B, 112C, 112D) is bound to one of the CPUs (116A, 116Z). As shown in FIG. 1B, a pair of virtual serialization queues (e.g., Virtual Serialization Queue A (112A) and Virtual Serialization Queue B (112B)) is bound to one CPU (e.g., CPU A (116A)). Although FIG. 1B shows a pair of virtual serialization queues bound to a single CPU, those skilled in the art will appreciate that any number of virtual serialization queues may be bound to a CPU.

As discussed above, the host (101) includes one or more packet destinations (118) (e.g., containers and/or services). In one embodiment of the invention, the packet destination(s) (118) (e.g., containers and/or services) corresponds to any process or group of processes executing on the host that sends and receives network traffic. Examples of packet destinations (118) include, but are not limited to, containers, services (e.g., web server, a monitoring application, etc.), etc. In one embodiment of the invention, each packet destination (118) (e.g., containers and/or services) may be associated with one or more virtual serialization queues (112A, 112B, 112C, 112D).

Figure 2:
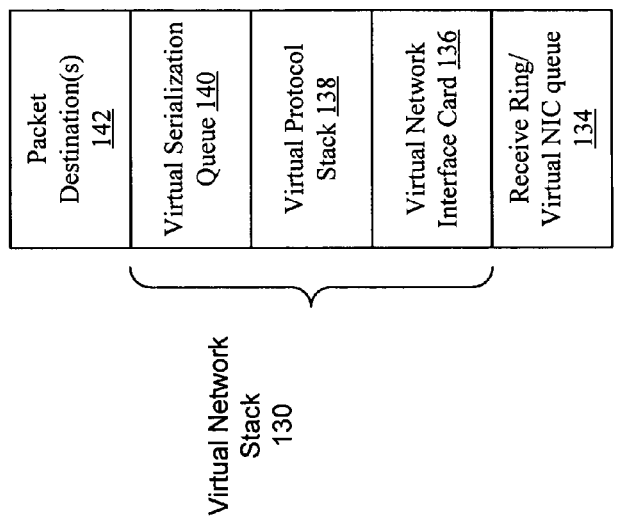
FIG. 2 shows a virtual network stack in accordance with one embodiment of the invention.

In one embodiment of the invention, the receive rings, and the virtual NIC queues may be generally referred to as temporary data structures. Further, in one embodiment of the invention, a system, as shown in FIGS. 1 and 2, may include multiple hosts (such as host (100) in FIG. 1 and host (101) in FIG. 2) where each host is operatively connected to one or more NICs. In one embodiment of the invention, each of the NICs may correspond to the NIC shown in FIG. 1 (i.e., NIC (102)) or the NIC shown in FIG. 1B (i.e., NIC (103)). Thus, in a given system, one host may include a software classifier while another host may be connected to a NIC with a hardware classifier. In this scenario, the host would be configured to support both implementations, as described above with in FIGS. 1A and 1B.

Those skilled in the art will appreciate that the receive rings (106A, 106D) and the virtual NIC queues (111A, 111D) are typically configured to store a limited number of packets. Further, once the receive rings (106A, 106D) and the virtual NIC queues (111A, 111D) are "full" (i.e., the receive rings (106A, 106D) and the virtual NIC queues (111A, 111D) cannot store any additional packets), then the packets received after this point are dropped (i.e., they are not stored in the receive rings (106A, 106D) or the virtual NIC queues (111A, 111D). Further, those skilled in the art will appreciate that the receive rings (106A, 106D) and the virtual NIC queues (111A, 111D) become "full" when the rate at which the packets are received by the receive rings (106A, 106D) and the virtual NIC queues (111A, 111D) is greater than the rate at which the packets are removed from the receive rings (106A, 106D) and the virtual NIC queues (111A, 111D) by the corresponding virtual serialization queues (112A, 112B, 112C, 112D).

FIG. 2 shows a virtual network stack in accordance with one embodiment of the invention. Various components described above in FIG. 1A and FIG. 1B may be collectively referred to as a virtual network stack (130). In one embodiment of the invention, the virtual network stack (130) includes a virtual NIC (136), a virtual protocol stack (138), and a virtual serialization queue (140). In one embodiment of the invention, the virtual network stack (130) may be bound to one or more receive rings or virtual NIC interfaces (134) (depending on the implementation). Further, the virtual network stack (130) may be bound to one or more packet destinations (142) (e.g., containers and/or services). All of the aforementioned components in the virtual network stack (130) are bound together such that a packet received by the virtual NIC (136) of a particular virtual network stack (130) is forwarded through the other components of the virtual network stack (130) until the packet reaches the packet destination (142) (e.g., containers and/or services) associated with the particular virtual network stack (130). In one embodiment of the invention, the host includes multiple virtual network stacks (130) each of which includes a virtual NIC (136), a virtual protocol stack (138), and a virtual serialization queue (140).

Figure 3:
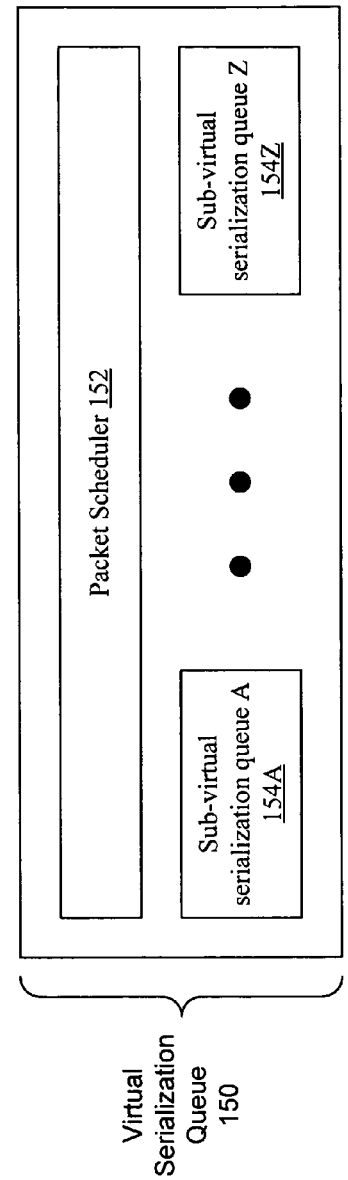
FIG. 3 shows a virtual serialization queue in accordance with one embodiment of the invention.

FIG. 3 shows a virtual serialization queue in accordance with one embodiment of the invention. In one embodiment of the invention, the virtual serialization queue (150) includes a packet scheduler (152) and one or more sub-virtual serialization queues (154A, 154Z). In one embodiment of the invention, each sub-virtual serialization queue (154A, 154Z) may be configured to queue specific types of packets. For example, the sub-virtual serialization queues (154A, 154Z) may be configured to queue received packets based on the protocol (e.g., IP Security Protocol (IPsec), TCP, IP, UDP, etc.) used to send the packet. Those skilled in the art will appreciate that each sub-virtual serialization queue (154A, 154Z) may be configured to queue any specified subset of packets. In one embodiment of the invention, if the virtual serialization queue (150) includes one or more sub-virtual serialization queues (154A, 154Z), then each of the sub-virtual serialization queues (154A, 154Z) is bound to the same CPU and associated with the same virtual network stack. Further, if the virtual serialization queue (150) includes one or more sub-virtual serialization queues (154A, 154Z), then the virtual network stack associated with the sub-virtual serialization queues (154A, 154Z) is also associated with a corresponding number of receive rings and/or virtual NIC queues (depending on the implementation). Thus, each of the sub-virtual serialization queues (154A, 154Z) are bound to one of the aforementioned receive rings and/or virtual NIC queues (depending on the implementation). Thus, when the virtual serialization queue (150) receives packets from one or more associated receive rings or virtual NIC queues (not shown) (depending on the implementation) via the associated virtual network stack, the virtual serialization queue (150) places the packets in the appropriate sub-virtual serialization queue (154A, 154Z) based on which receive ring or virtual NIC queue the packets were received from. In one embodiment of the invention, each of the sub-virtual serialization queues (154A, 154Z) includes a pair of FIFO queues, namely an inbound queue and an outbound queue.

Those skilled in the art will appreciate that a virtual serialization queue (150) does not necessarily include any sub-virtual serialization queues (154A, 154Z). If the virtual serialization queue (150) does not include any sub-virtual serialization queues (154A, 154Z), then the virtual serialization queue (150) may include only a single pair of queues.

In one embodiment of the invention, the packet scheduler (152) is configured to process the packets stored in each of the sub-virtual serialization queues (154A, 154Z). More specifically, the packet scheduler (152) schedules how packets queued in the various sub-virtual serialization queues (154A, 154Z) are to be processed (i.e., the order of processing of those packets, etc.). In one embodiment of the invention, the packet scheduler (150) may include functionality to support both fair-share scheduling and time-sharing scheduling with respect to processing of the packets queued on the sub-virtual serialization queues (154A, 154Z). Further, the packet scheduler (150) may also be configured to schedule packet processing based on the priority associated with each of the sub-virtual serialization queues (154A, 154Z).

Figure 4:
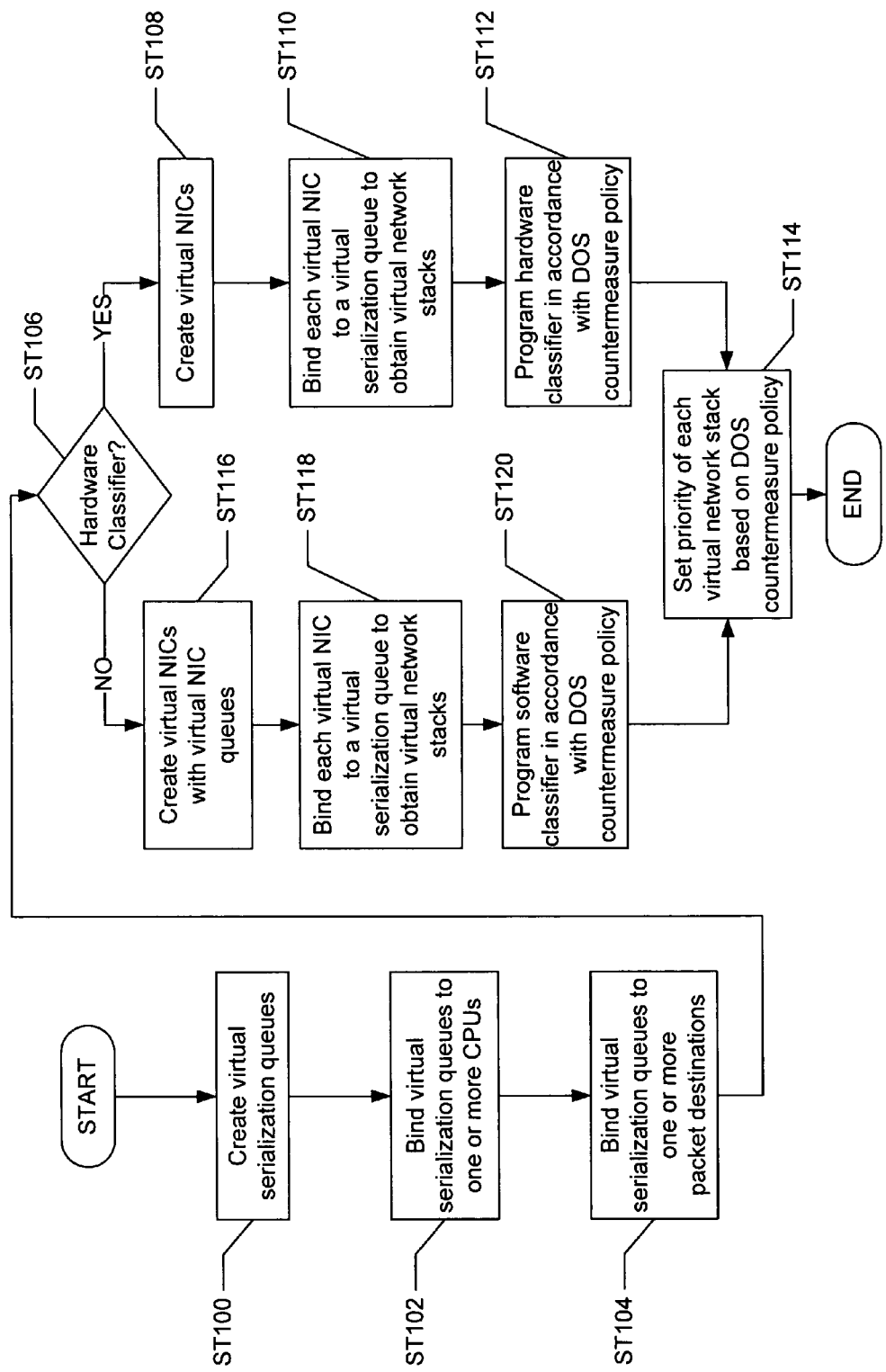
FIG. 4 shows a flowchart in accordance with one embodiment of the invention.

FIG. 4 shows a flowchart in accordance with one embodiment of the invention. Initially, one or more virtual serialization queues are created (ST100). In one embodiment of the invention, creating the virtual serialization queues may include specifying one or more sub-virtual serialization queues and configuring the packet scheduler. In one embodiment of the invention, the number of virtual serialization queues created in ST100 is based on the DoS countermeasure policy (discussed below). Each of the virtual serialization queues is subsequently bound to one or more CPUs on the host (ST102). Those skilled in the art will appreciate that the virtual serialization queues created in ST100 may be implicitly bound to a CPU upon creation.

At this stage, each virtual serialization queue is bound to a packet destination (e.g., containers and/or services) (ST104). Those skilled in the art will appreciate that the packet destination (118) may be bound to the virtual serialization queue any time after the virtual serialization queue has been created.

Continuing with the discussion in FIG. 4, a determination is then made as to whether a NIC associated with the host includes a hardware classifier (ST 106). If the NIC includes a hardware classifier, then a number of virtual NICs are created (ST108). At least one virtual NIC created in ST108 is bound to each of the virtual serialization queues created in ST100 to obtain virtual network stacks (ST110). The hardware classifier is subsequently programmed such that network traffic for the virtual network stack created in ST110 is directed to a particular receive ring by the hardware classifier based on the DoS countermeasure policy (discussed below) (ST112).

Those skilled in the art will appreciate that the DoS countermeasure policy may correspond to a pre-configured DoS countermeasure policy or may be customized by the user. Further, the DoS countermeasure policy may be created or obtained at anytime prior to programming the hardware classifier. The priority of each of the virtual serialization queues is subsequently set in accordance with the DoS countermeasure policy.

Continuing the discussion of FIG. 4, if the NIC does not include a hardware classifier (i.e., the scenario in which the host includes a NIC having a software classifier), then virtual NICs with virtual NIC queues are created (ST116) and bound to the virtual serialization queues created in ST100 to obtain virtual network stacks (ST118). The software classifier is then programmed such that the network traffic for the virtual network stack created in ST110 is directed to a particular virtual NIC queue by the software classifier based on the DoS countermeasure policy (discussed below). In one embodiment of the invention, the virtual NIC queues are configured in the same manner as the receive rings in described above. The method then proceeds to ST114.

Once the virtual network stack(s) has been created, as described above, the host may proceed to receive packets from the network. Those skilled in the art will appreciate that the number of virtual network stacks created using the steps shown in FIG. 4 may vary based on the DoS countermeasure policy.

In one embodiment of the invention, setting a virtual serialization queue at a specific priority (high, low, etc.) defines the order in which the packets are processed off of the various serialization queues as well as the frequency with which packets are requested from the receive rings or virtual NIC queues associated with the virtual serialization queues. Those skilled in the art will appreciate that the terms "high" and "low" are intended to convey a relative priority as opposed to an absolute priority.

In one embodiment of the invention, the DoS countermeasure policy corresponds to the number of virtual network stacks used to counter a DoS attack on the host. Those skilled in the art will appreciate that the DoS countermeasure policy may specify any number of virtual serialization queues. In addition, the DoS countermeasure policy may specify the priority of each of the specified virtual network stacks as well as which packets should be forwarded to which virtual network stack. Further, the DoS countermeasure policy may specify under what circumstances the DoS countermeasure policy is activated. In one embodiment of the invention, the system may include more than one DoS countermeasure policy. In such scenarios, each DoS countermeasure policy may be activated in response to a different set of circumstances. For example, a first DoS countermeasure policy may be activated when there is a light DoS attack in progress and a second DoS countermeasure policy may be activated when there is a heavy DoS attack in progress. Those skilled in the art will appreciate that the terms "heavy" and "light" are relative terms and may be defined, for example, on a per-host basis.

Figure 5:
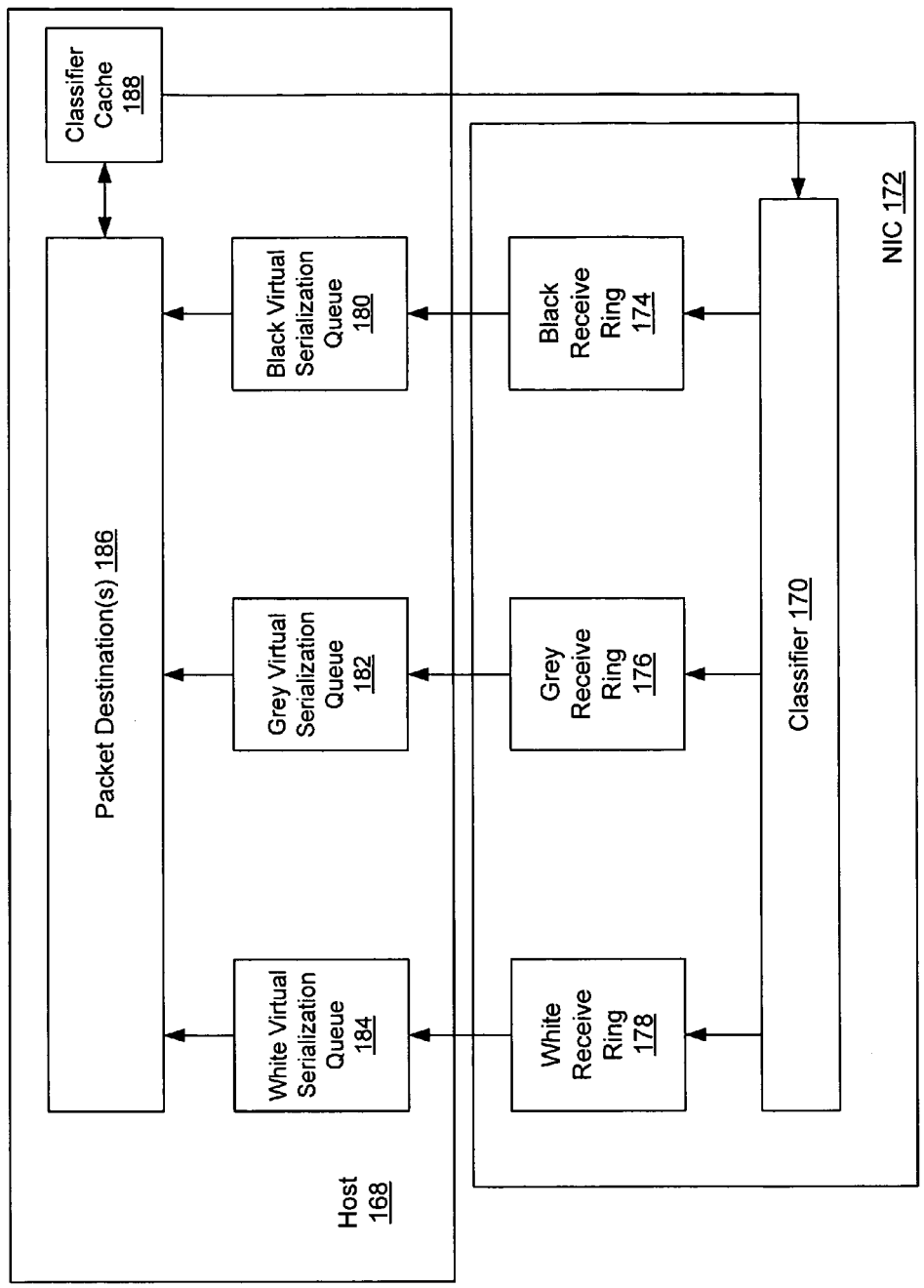
FIGS. 5 and 6 show systems in accordance with one embodiment of the present invention.
Figure 6:
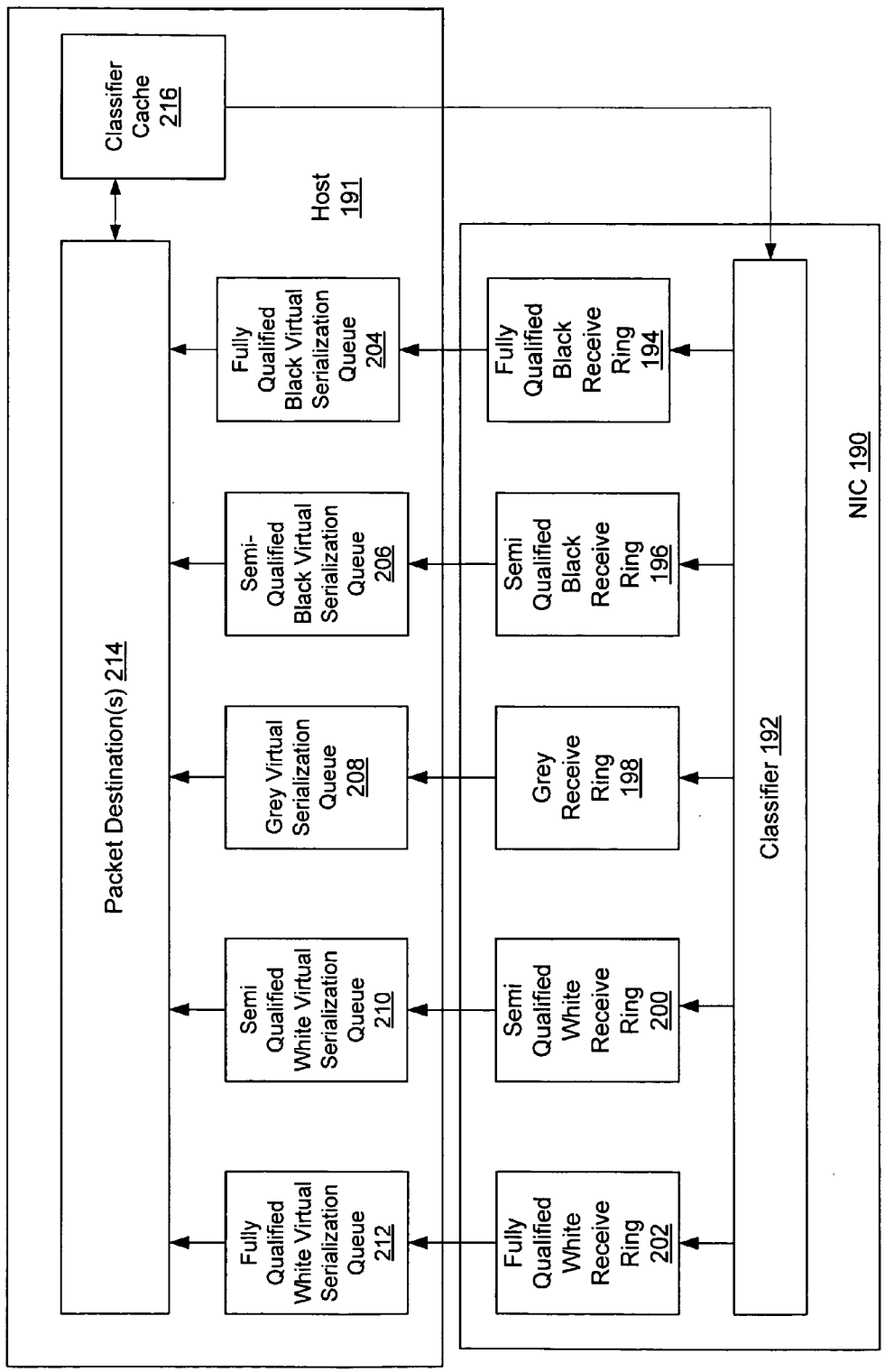

FIGS. 5 and 6 show systems implementing two different DoS countermeasure policies in one or more embodiments of the invention. The DoS countermeasure policies are exemplary in nature and not intended to limit the scope of the invention.

The following is an example of a DoS countermeasure policy in accordance with one embodiment of the invention. The DoS countermeasure policy specifies that there should be three virtual network stacks where each network stack includes a different priority. Further, the system includes a classifier (hardware or software) that is configured to forward received packets to one of the aforementioned virtual network stacks depending on whether or not packet information (e.g., source IP address, destination IP address, source TCP port, destination TCP port, etc.) associated with the packet is present on either of two lists. In addition, the contents of the aforementioned lists should be cleared periodically (e.g., after a certain period of time). In one embodiment of the invention, clearing the lists also include de-programming the classifier (i.e., removing the packet classification rules corresponding the packets on the various lists that have been cleared). In one embodiment of invention, each entry in the list (i.e., the packet information corresponding to an individual packet or set of packets) is cleared on per-entry basis (i.e., each entry is present on the list for only a certain period of time).

The system shown in FIG. 5 implements the aforementioned DoS countermeasure policy in the following manner. Specifically, the NIC (172) includes a classifier (170) and three receive rings: a white receive ring (178), a grey receive ring (176), and a black receive ring (174). The classifier (170) is configured to analyze the incoming network traffic, typically in the form of packets, received from the network (not shown), and forward the packets to the appropriate receive ring (e.g., 174, 176, 178). Once the packets are placed on the individual receive rings (e.g., 174, 176, 178), the packets remain on the receive rings (e.g., 174, 176, 178) until the virtual serialization queue (e.g., 180, 182, 184) associated with the particular receive ring (e.g., 174, 176, 178) requests the receive ring (e.g., 174, 176, 178) to forward the packets to the virtual serialization queue (e.g., 180, 182, 184). The packets are subsequently pulled from the virtual serialization queues (e.g., 180, 182, 184) to the packet destination(s) (186) for further processing. In accordance with the DoS countermeasure policy, the virtual network stack that includes the white virtual serialization queue (184) is set at a higher priority than the virtual network stack that includes the grey virtual serialization queue (182). Further, the virtual network stack that includes the grey virtual serialization queue (182) is set at a higher priority than the virtual network stack that includes the black virtual serialization queue (180).

As shown in FIG. 5, the host (168) also includes a classifier cache (188). In one embodiment of the invention, the classifier cache (188) corresponds to a memory (e.g., RAM) on the host (168) that is configured to store a white list (not shown) and a black list (not shown). Further, the host (168) is configured to program the classifier (170), using the white list (not shown) and the black list (not shown). In addition, the host (186) is also configured to update the contents of the white list (not shown) and the black list (not shown) in accordance with the DoS countermeasure policy. In one embodiment of the invention, updating the contents of the classifier cache (188) includes periodically clearing the classifier cache (e.g., every five minutes) and adding additional packet information to the classifier cache (188).

In one embodiment of the invention, the white list (not shown) includes packet information associated with packets that have previously passed a Turing Test (discussed below in FIG. 8). In contrast, the black list (not shown) includes packet information associated with packets that have not previously passed a Turing Test (discussed below in FIG. 8). The classifier (170) is configured such that the packets that include packet information listed on the black list (not shown) are forwarded to the black receive ring (174), the packets that include packet information listed on the white list (not shown) are forwarded to the white receive ring (178). Any packets that include packet information not listed on either of the aforementioned lists are forwarded to the grey receive ring (176).

Those skilled in the art will appreciate that the amount of packet information stored in the white list and the black list may vary depending on the implementation and the list. For example, the white list may store the source IP address as one entry in the list and the full connection information (e.g., source IP address, destination IP address, source TCP port, destination TCP port) of the connection with which the packet is associated with another entry in the list. Thus, all packets associated the connection as well as all packets from the same source IP address that are subsequently received are forwarded to the white receive ring (178). The black list may also store the packet information in a similar manner. However, in other scenarios, the white list may only store the full connection information and the black list may only store the source IP address.

The following is another example of a DoS countermeasure policy in accordance with one embodiment of the invention. The DoS countermeasure policy specifies that there should be five virtual network stacks where each network stack includes a different priority. Further, the system includes a classifier (hardware or software) that is configured to forward received packets to one of the aforementioned virtual network stacks source IP address of the destination and the connection with which the packet is associated depending on whether or not packet information (e.g., source IP address and full connection information) associated with the packet is present on either of four lists. In addition, the contents of the aforementioned lists should be cleared periodically.

The system shown in FIG. 6 implements the aforementioned DoS countermeasure policy in the following manner. Specifically, the NIC (190) includes a classifier (192) and five receive rings: a fully-qualified white receive ring (202), a semi-qualified white receive ring (200), a grey receive ring (198), a semi-qualified black receive ring (196), and a fully-qualified black receive ring (194). The classifier (192) is configured to analyze the incoming network traffic, typically in the form of packets, received from the network (not shown), and forward the packets to the appropriate receive ring (194, 196, 198, 200, 202). Once the packets are placed on the individual receive rings (194, 196, 198, 200, 202), the packets remain on the receive rings (194, 196, 198, 200, 202) until the virtual serialization queue (204, 206, 208, 201, 212) associated with the particular receive ring (194, 196, 198, 200, 202) requests the receive ring (194, 196, 198, 200, 202) to forward the packets to the virtual serialization queue (204, 206, 208, 201, 212).

The packets are subsequently pulled from the virtual serialization queues (204, 206, 208, 201, 212) to the packet destination(s) (214) for further processing. In accordance with the DoS countermeasure policy, the virtual network stack that includes the fully qualified white virtual serialization queue (212) is set at a higher priority than the virtual network stack that includes the semi-qualified white virtual serialization queue (210). Further, the virtual network stack that includes the semi-qualified white virtual serialization queue (210) is set at a higher priority than the virtual network stack that includes the grey virtual serialization queue (208). Further, the virtual network stack that includes the grey virtual serialization queue (210) is set at a higher priority than the virtual network stack that includes the semi-qualified black virtual serialization queue (208). Finally, the virtual network stack that includes the semi-qualified black virtual serialization queue (210) is set at a higher priority than the virtual network stack that includes the fully-qualified black virtual serialization queue (208).

As shown in FIG. 6, the host (168) also includes a classifier cache (188). In one embodiment of the invention, the classifier cache correspond to a memory (e.g., RAM) on the host (168) that is configured to store a qualified white list, a semi-qualified white list, a qualified black list, a semi-qualified black list (all of which are not shown). Further, the host (168) is configured to program the classifier (170), using the aforementioned lists. In addition, the host (186) is also configured to update the contents of the aforementioned lists in accordance with the DoS countermeasure policy. In one embodiment of the invention, updating the contents of the classifier cache (216) includes periodically clearing the classifier cache (e.g., every five minutes) and adding additional packet information to the classifier cache (216).

In accordance with the aforementioned DoS countermeasure policy, the fully-qualified white list is configured to store full connection information associated with each packet whose source has provided a successful response to the Turing test. The semi-qualified white list is configured to store the source IP address of each source that has provided a successful response to the Turing test. Those skilled in the art will appreciate that the when a successful response to the Turing test is received, both the fully-qualified white list and the semi-qualified white list may be populated using packet information associated with the same packet. For example, the full connection information associated with the packet may be stored in the fully-qualified white list, while the source IP address of the packet may be stored in the semi-qualified black list. Accordingly, when a subsequent packet arrive from same source on the same connection as the aforementioned packet, the subsequent packet is placed on the fully-qualified white receive ring. However, if the subsequent packet is only from the same source but on a different connection, then the subsequent packet is placed on the semi-qualified white receive ring.

Similarly, in accordance with the aforementioned DoS countermeasure policy, the fully-qualified black list is configured to store full connection information associated with each packet whose source has provided an unsuccessful response (which also may include a failure to respond) to the Turing test. The semi-qualified black list is configured to store the source IP address of each source who has provided an unsuccessful response to the Turing test. Those skilled in the art will appreciate that when an unsuccessful response to the Turing test is received (or no response is received), both the fully-qualified black list and the semi-qualified black list may be populated using packet information associated with the same packet. For example, the full connection information associated with the packet may be stored in the fully-qualified black list, while the source IP address of the packet may be stored in the semi-qualified black list. Accordingly, when a subsequent packet arrives from same source on the same connection as the aforementioned packet, the subsequent packet is placed on the fully-qualified black receive ring. However, if the subsequent packet is only from the same source but on a different connection, then the subsequent packet is placed on the semi-qualified black receive ring.

Figure 7:
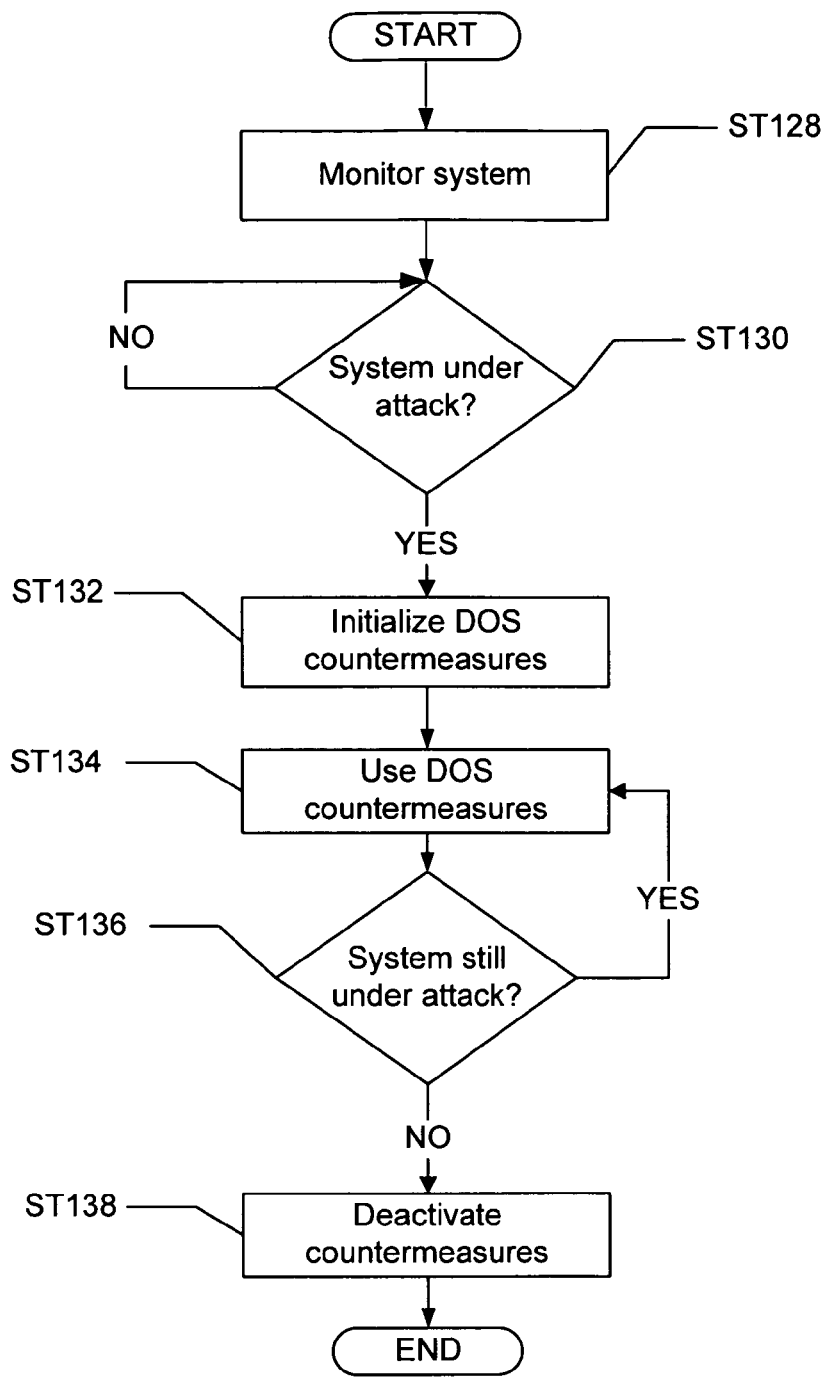
FIGS. 7 and 8 show a flowcharts in accordance with one embodiment of the invention.

FIG. 7 shows a flowchart in accordance with one embodiment of invention.

Initially, the system is monitored (ST128). In one embodiment of the invention, the system monitoring may include monitoring the volume of network traffic received by the system (as well as other characteristics of the system) to determine whether the system is under a DoS attack. Those skilled in the art will appreciate that the determination of whether the system is under a DoS attack may be determined using techniques well known in the art.

If a DoS attack is occurring (ST130), the system proceeds to initialize the DoS countermeasures (ST820). In one embodiment of the invention, initializing the DoS countermeasures may include configuring the system in accordance with the DoS countermeasure policy, for example, as shown in FIGS. 5 and 6. Alternatively, initializing the DoS countermeasures may include activating the DoS countermeasures that have been previously configured. The DoS countermeasures are subsequently used to defend against the DoS attack (discussed in FIG. 8).

Periodically, a determination is made whether the system is still under attack (ST136). If the system is still under attack, the DoS countermeasures continue to be used until such time as the attack is terminated. Once it is determined that the system is no longer under attack, the system proceeds to deactivate the DoS countermeasures and resume normal operation (ST138).

Figure 8:
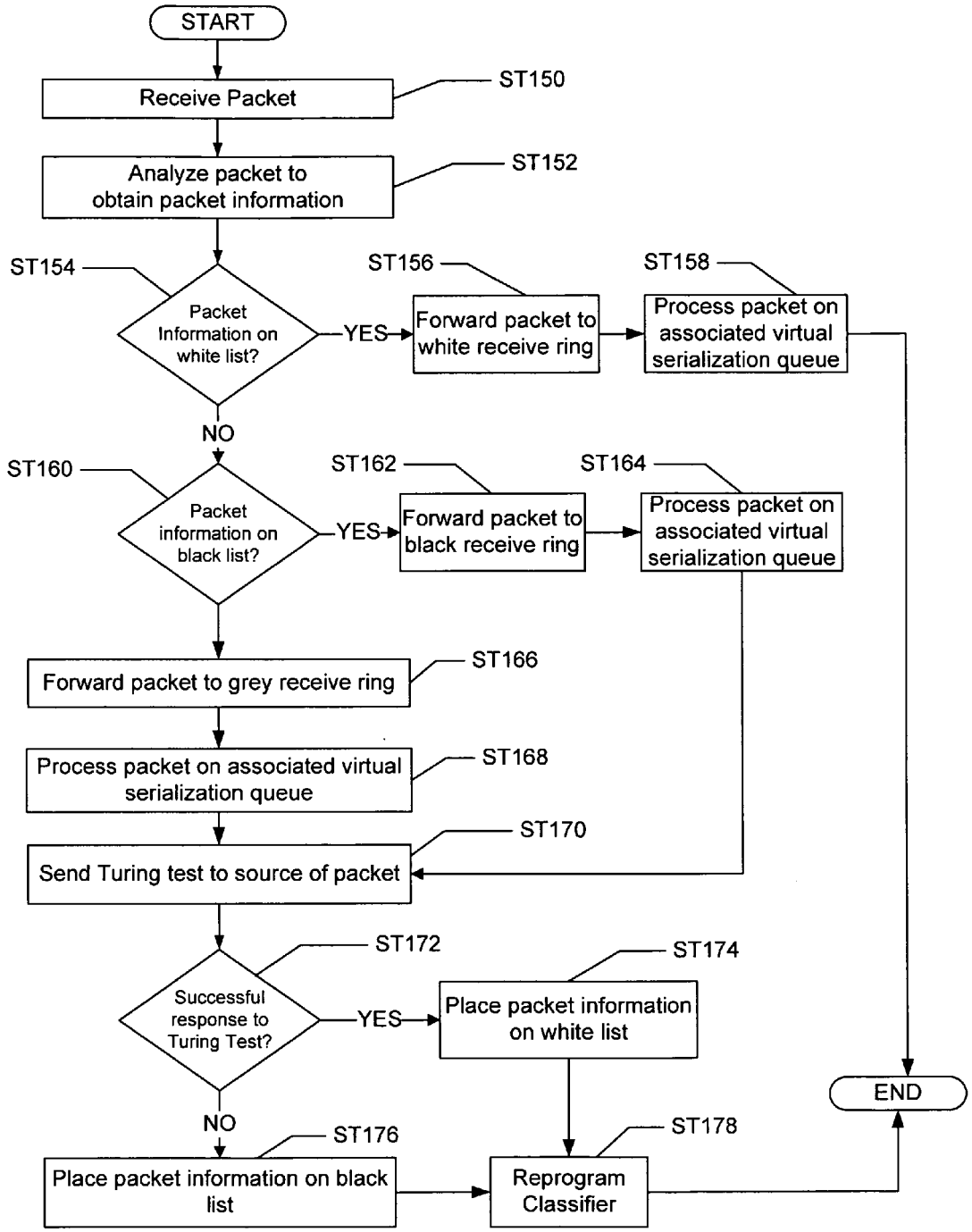

FIG. 8 shows a flowchart for using the DoS countermeasure policy shown in FIG. 5, once an attack has been detected and the DoS countermeasures have been initialized. Initially, a packet is received by the NIC (ST150). The packet is subsequently analyzed to obtain packet information (ST152). The classifier subsequently uses the packet information to determine to which receive ring to forward the packet. More specifically, the classifier is programmed such that if the packet information (or a portion thereof) associated with the packet is on the white list (ST154), then the packet is forwarded to the white receive ring (ST156). The packet is subsequently forwarded (upon request) to the virtual serialization queue associated with the white receive ring for processing (ST158). Processing of the packets that were forwarded to the white receive ring corresponds to processing that would have occurred during normal operation (i.e., if the DoS countermeasures were not activated).

The classifier is also programmed such that if the packet information (or a portion thereof) associated with the packet is on the black list (ST160), then the packet is forwarded to the black receive ring (ST162). The packet is subsequently forwarded (upon request) to the virtual serialization queue associated with the black receive ring for processing (ST164).

Finally, the classifier is programmed such that if the packet information (or a portion thereof) associated with the packet is not on the white list or the black list, then the packet is forwarded to the grey receive ring (ST166). The packet is subsequently forwarded (upon request) to the virtual serialization queue associated with the grey receive ring for processing (ST168).

If the packet was forwarded to either the black receive ring (ST162) or the grey receive ring (ST164), then processing of the packet (from the virtual serialization queue associated with the grey receive ring or the black receive ring) includes sending a Turing test to the source of the packet (ST170). In one embodiment of the invention, the Turing test corresponds to any test that requests a user to provide a response and the response cannot be computer generated. A common example of a Turing test is an image that contains a word (or alphanumeric sequence) written in a manner that cannot be understood by a computer. In response to receiving the image, the user is requested to type in the word (or alphanumeric sequence). The purpose of the Turing test is to ensure that a system controlled by a user, as opposed to a system acting on its own or controlled by another system, is sending the packets to the host. Those skilled in the art will appreciate that the invention is not limited to using a Turing test; rather, the invention may be implemented using any test that requires a user to provide a response, where the response cannot be automatically generated by a computer without user input.

Continuing with the discussion of FIG. 8, if a successful response to the Turning test is received, the packet information (or a portion thereof) associated with the packet is placed on the white list (ST174). However, if an unsuccessful response (including no response) to the Turning test is received, the packet information (or a portion thereof) associated with the packet is placed on the black list (ST176). Those skilled in the art will appreciate, that the source of the packet (i.e., the system sending the packet to the host) may be allowed to fail the Turing test a specific number of times prior to packet information (or portion thereof) being placed on the black list. Continuing with the discussion of FIG. 8, the classifier is subsequently reprogrammed using the packet information (or portion thereof) obtained in ST174 and/or ST176.

In view of the flowchart in FIG. 8, packets from sources that had previously satisfied the Turing test are processed as if the system was operating without the DoS countermeasures. However, packets from sources that previously provided unsuccessful responses to the Turing test are prevented from being processed in a manner that would significantly impact the system by forwarding such packets to a receive ring (i.e., the black receive ring) with a very low priority. Finally, the packets about which nothing was known (i.e., packets that the classifier forwarded to the grey list) are given an opportunity to prove that they are valid packets (i.e., not packets associated with a DoS attack) by successfully responding to the Turing test. Depending on the results of the Turing test, the packets on the grey list would then be subject to the processing constraints associated with the white or black receive rings. Thus, the embodiments of the aforementioned approach provide a method and apparatus for effectively defending against DoS attacks.

Those skilled in the art will appreciate in one embodiment of the present invention, all packets for the particular virtual serialization queue are forwarded from the receive ring or virtual NIC queue to the virtual serialization queue each time the virtual serialization queue requests packets from the receive ring or virtual NIC queue. Those skilled in the art will appreciate that the receive rings and/or virtual NIC queues store a finite number of packets. Thus, if the receive rings and/or virtual NIC queues are receiving packets at a faster rate than the corresponding virtual serialization queue is requesting packets, the receive rings and/or virtual NIC queues fill with packets and packets received after this point are dropped until packets on the receive rings and/or virtual NIC queues are requested and processed.

Figure 9:
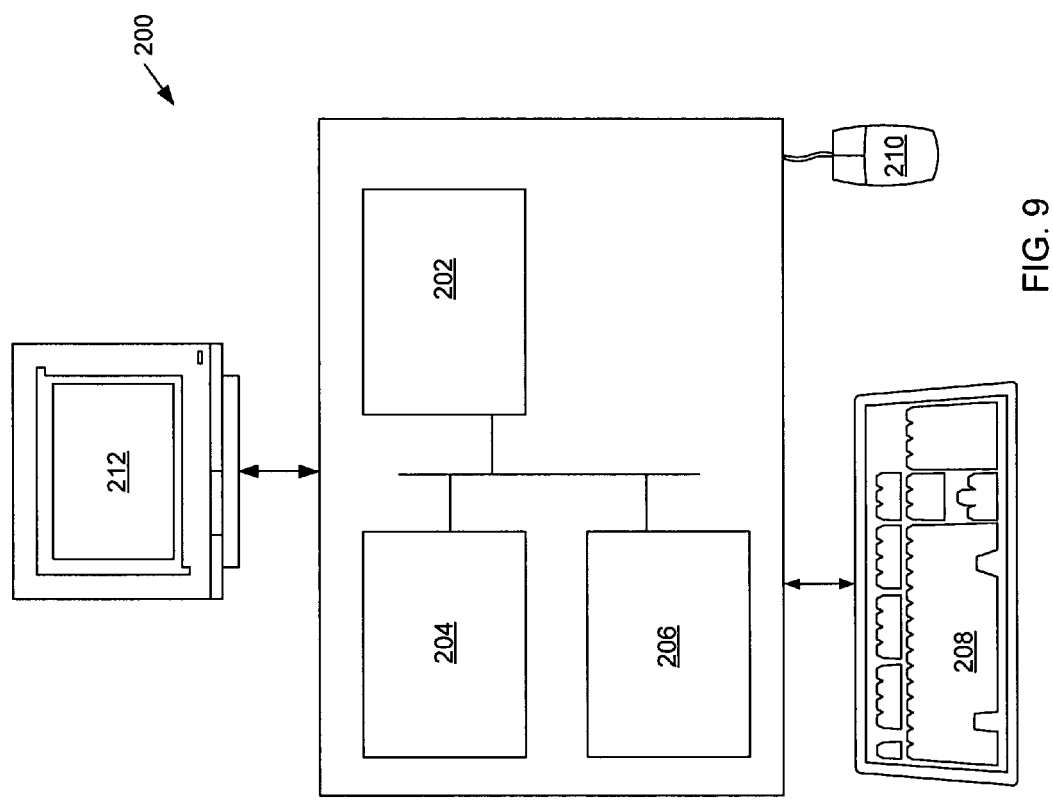
FIG. 9 shows a computer system in accordance with one embodiment of the invention.

An embodiment of the invention may be implemented on virtually any type of computer regardless of the platform being used. For example, as shown in FIG. 9, a networked computer system (200) includes a processor (202), associated memory (204), a storage device (206), and numerous other elements and functionalities typical of today's computers (not shown). The networked computer (200) may also include input means, such as a keyboard (208) and a mouse (210), and output means, such as a monitor (212). The networked computer system (200) is connected to a local area network (LAN) or a wide area network via a network interface connection (not shown). Those skilled in the art will appreciate that these input and output means may take other forms. Further, those skilled in the art will appreciate that one or more elements of the aforementioned computer (200) may be remotely located and connected to the other elements over a network. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for processing packets, comprising:
   receiving, by a network interface card (NIC), a packet from a network, wherein the NIC is a hardware interface between a host and the network;
   analyzing, by the NIC, the packet to obtain packet information used to determine to which temporary data structure to forward the packet;
   if a fully qualified white list comprises the packet information indicating that the packet is received from a source on a same connection that has previously provided a successful response to a first test:
      forwarding, by the NIC, the packet to a fully qualified white temporary data structure on the NIC, and
      transmitting the packet to a fully qualified white virtual serialization queue on a host from the fully qualified white temporary data structure;
   if a semi qualified white list comprises a source Internet Protocol (IP) address in the packet information indicating that the packet is received from a same IP address as the source that has previously provided the successful response to the first test:
      forwarding, by the NIC, the packet to a semi qualified white temporary data structure on the NIC, and
      transmitting the packet to a semi qualified white virtual serialization queue on the host from the semi qualified white temporary data structure;
   if a fully qualified black list comprises the packet information indicating that the packet is received from a source on a same connection that has previously provided a unsuccessful response to a second test:
      forwarding, by the NIC, the packet to a fully qualified black temporary data structure on the NIC, and
      transmitting the packet to a fully qualified black virtual serialization queue on the host from the fully qualified black temporary data structure;
   if a semi qualified black list comprises the IP address in the packet information indicating that the packet is received from a same IP address as the source that has previously provided the unsuccessful response to the first test:
      forwarding, by the NIC, the packet to a semi qualified black temporary data structure on the NIC, and
      transmitting the packet to a semi qualified black virtual serialization queue on the host from the semi qualified black temporary data structure; and
   if the fully qualified white list, semi qualified white list, fully qualified black list, semi qualified black list each do not comprise the source IP address:
      forwarding, by the NIC, the packet to a grey temporary data structure, processing the packet, wherein processing the packet comprises:
         sending a second test to the source of the packet,
         placing the packet information on the fully qualified white list and the source IP address on the semi qualified white list, if a successful response to the second test is received, and
         placing the packet information on the fully qualified black list and the source IP address on the semi qualified black list, if an unsuccessful response to the second test is received.

2. The method of claim 1, wherein the second test is a Turing test.

3. The method of claim 1, wherein packets in the fully qualified white temporary data structure are processed at a higher priority than packets in the semi qualified white temporary data structure, packets in the semi qualified white temporary data structure are processed at a higher priority than packets in the semi qualified black temporary data structure, and packets in the semi qualified black temporary data structure are processed at a higher priority than packets in the fully qualified black temporary data structure.

4. The method of claim 1, wherein the first test is a Turing test.

5. The method of claim 1, wherein the fully qualified white temporary data structure, semi qualified white temporary data structure, fully qualified black temporary data structure, and semi qualified black temporary data structure comprises at least one selected from the group consisting of a virtual NIC queue and a receive ring.

6. The method of claim 1, wherein analyzing the source IP address to determine to which temporary data structure to forward the packet comprises using a classifier.

7. The method of claim 6, wherein the classifier is one selected from the group consisting of a hardware classifier and a software classifier.

8. The method of claim 1, wherein the fully qualified white list and the fully qualified black list are cleared periodically.

9. A system, comprising:
a network interface located on a network interface card (NIC) and configured to receive a plurality of packets from a network;
a processor located on the NIC, operatively connected to the network interface, and configured to analyze each of the plurality of packets to determine to which of a plurality of temporary data structures each of the plurality of packets is forwarded based on packet information each of the plurality of packets, a fully qualified white list, a semi qualified white list, a semi qualified black list, and a fully qualified black list;
a fully qualified white temporary data structure of the plurality of temporary data structures configured to receive packets from the processor, wherein the packet information for each of the plurality of packets forwarded to the fully qualified white temporary data structure is on the fully qualified white list indicating that the plurality of packets forwarded to the fully qualified white list is received from a source on a same connection that has previously provided a successful response to a test;
a semi qualified white temporary data structure of the plurality of temporary data structures configured to receive packets from the processor, wherein the packet information comprises a source IP address for each of the plurality of packets forwarded to the semi qualified white temporary data structure that is on the semi qualified white list indicating that the plurality of packets forwarded to the semi qualified white list is received from a same IP address as a source that has previously provided a successful response to the test;
a fully qualified black temporary data structure of the plurality of temporary data structures configured to receive packets from the processor, wherein the packet information for each of the plurality of packets forwarded to the fully qualified black temporary data structure is on the fully qualified black list indicating that the plurality of packets forwarded to the fully qualified black list is received from a source on a same connection that has previously provided an unsuccessful response to a test;
a semi qualified black temporary data structure of the plurality of temporary data structures configured to receive packets from the processor, wherein the packet information comprises a source IP address for each of the plurality of packets forwarded to the semi qualified black temporary data structure that is on the semi qualified black list indicating that the plurality of packets forwarded to the semi qualified black list is received from a same IP address as a source that has previously provided a successful response to the test; and
a grey temporary data structure of the plurality of temporary data structures configured to receive packets from the processor classifier, wherein the source IP address for each of the plurality of packets forwarded to the grey temporary data structure is not on any of the fully qualified white list, the semi qualified white list, the fully qualified black list, and the semi qualified black list,
wherein the system is configured to:
send the test to the source of each of the plurality of packets stored on the grey temporary data structure,
place the source IP address for each of the plurality of packets whose source supplies a successful response to the test on the semi qualified white list, and
place the packet information for each of the plurality of packets whose source supplies a successful response to the test on the fully qualified white list.

10. The system of claim 9, wherein the test is a Turing test.

11. The system of claim 9, further comprising:
a classifier cache configured to store the fully qualified white list and the fully qualified black list.

12. The system of claim 11, wherein the system uses the fully qualified white list and the fully qualified black list in the classifier cache to program a classifier executing on the processor.

13. The system of claim 9, wherein each of the plurality of temporary data structure comprises at least one selected from the group consisting of a virtual network interface card queue and a receive ring.

14. The system of claim 9, wherein packets in the fully qualified white temporary data structure are processed at a higher priority than packets in the semi qualified white temporary data structure, packets in the semi qualified white temporary data structure are processed at a higher priority than packets in the semi qualified black temporary data structure, and packets in the semi qualified black temporary data structure are processed at a higher priority than packets in the fully qualified black temporary data structure.

15. The system of claim 9, wherein the fully qualified black list and the fully qualified white list are cleared periodically.

16. A non-transitory computer readable medium, comprising instructions stored thereon for:
receiving, by a NIC, a packet from a network, wherein the NIC is a hardware interface between a host and the network;
analyzing, by the NIC, the packet to obtain packet information used to determine to which temporary data structure to forward the packet;
if a fully qualified white list comprises the packet information indicating that the packet is received from a source on a same connection that has previously provided a successful response to a first test:
forwarding, by the NIC, the packet to a fully qualified white temporary data structure on the NIC, and transmitting the packet to a fully qualified white virtual serialization queue on a host from the fully qualified white temporary data structure;
if a semi qualified white list comprises a source Internet Protocol (IP) address in the packet information indicating that the packet is received from a same IP address as the source that has previously provided the successful response to the first test:
  forwarding, by the NIC, the packet to a semi qualified white temporary data structure on the NIC, and
  transmitting the packet to a semi qualified white virtual serialization queue on the host from the semi qualified white temporary data structure;
if a fully qualified black list comprises the packet information indicating that the packet is received from a source on a same connection that has previously provided a unsuccessful response to a second test:
  forwarding, by the NIC, the packet to a fully qualified black temporary data structure on the NIC, and
  transmitting the packet to a fully qualified black virtual serialization queue on the host from the fully qualified black temporary data structure;
if a semi qualified black list comprises the IP address in the packet information indicating that the packet is received from a same IP address as the source that has previously provided the unsuccessful response to the first test:
  forwarding, by the NIC, the packet to a semi qualified black temporary data structure on the NIC, and
  transmitting the packet to a semi qualified black virtual serialization queue on the host from the semi qualified black temporary data structure; and
if the fully qualified white list, semi qualified white list, fully qualified black list, semi qualified black list each do not comprise the source IP address:
  forwarding the packet to a grey temporary data structure,
  processing the packet, wherein processing the packet comprises:
    sending a second test to the source of the packet,
    placing the packet information on the fully qualified white list and the source IP address on the semi qualified white list, if a successful response to the second test is received, and
    placing the packet information on the fully qualified black list and the source IP address on the semi qualified black list, if an unsuccessful response to the second test is received.

* * * * *

UNITED STATES PATENT AND TRADEMARK OFFICE
CERTIFICATE OF CORRECTION

| | | |
|---|---|---|
| PATENT NO. | : 8,635,284 B1 | Page 1 of 1 |
| APPLICATION NO. | : 11/255366 | |
| DATED | : January 21, 2014 | |
| INVENTOR(S) | : Tripathi et al. | |

It is certified that error appears in the above-identified patent and that said Letters Patent is hereby corrected as shown below:

In the Claim

Column 18, claim 9, line 15, "the processor classifier, wherein the source IP address" should read -- the processor, wherein the source IP address --

Signed and Sealed this
Sixteenth Day of September, 2014

Michelle K. Lee
*Deputy Director of the United States Patent and Trademark Office*